US008002626B2

(12) United States Patent
Englman

(10) Patent No.: US 8,002,626 B2
(45) Date of Patent: Aug. 23, 2011

(54) WAGERING GAME WITH ENHANCEMENT FEATURE FOR BONUS-TRIGGERING EVENT

(75) Inventor: Allon G Englman, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 947 days.

(21) Appl. No.: 11/795,167

(22) PCT Filed: Jan. 17, 2006

(86) PCT No.: PCT/US2006/001651
§ 371 (c)(1),
(2), (4) Date: Jul. 12, 2007

(87) PCT Pub. No.: WO2006/078670
PCT Pub. Date: Jul. 27, 2006

(65) Prior Publication Data

US 2008/0153563 A1 Jun. 26, 2008

Related U.S. Application Data

(60) Provisional application No. 60/645,481, filed on Jan. 18, 2005.

(51) Int. Cl.
*A63F 13/00* (2006.01)

(52) U.S. Cl. ................ 463/20; 463/16; 463/22; 463/29; 273/138.1; 273/139

(58) Field of Classification Search .......... 463/1, 10–13, 463/16–21, 23, 25–27, 29–34, 22; 273/138.1, 273/138.2, 139, 141 A, 142 B, 142 C, 142 J, 273/148 R, 429–432; *A63F 13/00*
See application file for complete search history.

(56) References Cited

U.S. PATENT DOCUMENTS

| | | | | |
|---|---|---|---|---|
| 5,632,485 | A | 5/1997 | Woodland et al. | 273/292 |
| 5,720,662 | A | 2/1998 | Holmes, Jr. et al. | 463/20 |
| 5,851,148 | A | 12/1998 | Brune et al. | 463/25 |
| 6,056,642 | A | 5/2000 | Bennett | 463/20 |
| 6,068,552 | A | 5/2000 | Walker et al. | 463/21 |
| 6,089,977 | A | 7/2000 | Bennett | 463/20 |

(Continued)

FOREIGN PATENT DOCUMENTS

WO WO 97/19736 6/1997

(Continued)

OTHER PUBLICATIONS

PR Newswire, Atronic's Rock and Rollin' Installed in Neveda, Jun. 20, 2000, Fulltext, p. 1.*

(Continued)

*Primary Examiner* — Arthur O. Hall
(74) *Attorney, Agent, or Firm* — Nixon Peabody LLP

(57) ABSTRACT

A gaming terminal (10) is utilized for playing a wagering game having a basic game and a bonus game. The gaming (10) terminal has a wager-input device (16*a*, 16*b*). A display (26) displays a plurality of moveable reels having symbols located thereon during the basic game. The symbols indicate a randomly selected outcome selected from a plurality of outcomes. The basic game implements a special mode in response to an enablement by a player. In response to the special mode being enabled and the movable reels displaying less than a full bonus triggering combination, the movable reels not displaying a portion of the full bonus triggering combination are re-spun.

29 Claims, 7 Drawing Sheets

U.S. PATENT DOCUMENTS

| | | | | |
|---|---|---|---|---|
| 6,110,041 | A | 8/2000 | Walker et al. | 463/20 |
| 6,120,378 | A | 9/2000 | Moody et al. | 463/20 |
| 6,155,925 | A | 12/2000 | Giobbi et al. | 463/20 |
| 6,159,095 | A | 12/2000 | Frohm et al. | 463/19 |
| 6,179,711 | B1 | 1/2001 | Yoseloff | 463/25 |
| 6,183,366 | B1 | 2/2001 | Goldberg et al. | 463/42 |
| 6,203,429 | B1 | 3/2001 | Demar et al. | 463/20 |
| 6,210,277 | B1 | 4/2001 | Stefan | 463/27 |
| 6,227,969 | B1 | 5/2001 | Yoseloff | 463/13 |
| 6,227,971 | B1 * | 5/2001 | Weiss | 463/20 |
| 6,237,916 | B1 | 5/2001 | Webb | 273/292 |
| 6,251,013 | B1 | 6/2001 | Bennett | 463/13 |
| 6,254,481 | B1 | 7/2001 | Jaffe | 463/20 |
| 6,261,178 | B1 | 7/2001 | Bennett | 463/20 |
| 6,270,411 | B1 | 8/2001 | Gura et al. | 463/20 |
| 6,290,600 | B1 | 9/2001 | Glasson | 463/20 |
| 6,350,199 | B1 | 2/2002 | Williams et al. | 463/16 |
| 6,419,579 | B1 | 7/2002 | Bennett | 463/20 |
| 6,485,367 | B1 * | 11/2002 | Joshi | 463/13 |
| 6,520,856 | B1 | 2/2003 | Walker et al. | 463/21 |
| 6,561,904 | B2 | 5/2003 | Locke et al. | 463/25 |
| 6,632,140 | B2 * | 10/2003 | Berman et al. | 463/18 |
| 6,746,328 | B2 | 6/2004 | Cannon et al. | 463/17 |
| 6,793,578 | B2 | 9/2004 | Luccesi et al. | 463/20 |
| 6,805,629 | B1 | 10/2004 | Weiss | 463/16 |
| 6,855,054 | B2 * | 2/2005 | White et al. | 463/21 |
| 6,860,810 | B2 | 3/2005 | Cannon et al. | 463/20 |
| 6,908,390 | B2 | 6/2005 | Nguyen et al. | 463/42 |
| 6,916,243 | B2 * | 7/2005 | Yoshida | 463/20 |
| 6,960,133 | B1 | 11/2005 | Marks et al. | 463/20 |
| 7,056,213 | B2 * | 6/2006 | Ching et al. | 463/20 |
| 7,090,580 | B2 * | 8/2006 | Rodgers et al. | 463/20 |
| 7,094,148 | B2 * | 8/2006 | Baerlocher et al. | 463/20 |
| 7,252,589 | B1 * | 8/2007 | Marks et al. | 463/16 |
| 2002/0020965 | A1 | 2/2002 | Potter et al. | 273/274 |
| 2002/0055382 | A1 | 5/2002 | Meyer | 463/20 |
| 2002/0086725 | A1 | 7/2002 | Fasbender et al. | 463/11 |
| 2002/0115488 | A1 | 8/2002 | Berry et al. | 463/42 |
| 2002/0142825 | A1 | 10/2002 | Lark et al. | 463/16 |
| 2002/0142846 | A1 | 10/2002 | Paulsen | 463/43 |
| 2002/0155881 | A1 | 10/2002 | Yoshida | 463/20 |
| 2002/0196342 | A1 | 12/2002 | Walker et al. | 348/157 |
| 2003/0027626 | A1 | 2/2003 | Marks et al. | 463/20 |
| 2003/0064797 | A1 | 4/2003 | Jackson et al. | 463/25 |
| 2003/0064800 | A1 | 4/2003 | Jackson et al. | 463/30 |
| 2003/0119579 | A1 | 6/2003 | Walker et al. | 463/20 |
| 2003/0162585 | A1 | 8/2003 | Bigelow, Jr. et al. | 463/20 |
| 2003/0216169 | A1 | 11/2003 | Walker et al. | 463/25 |
| 2004/0048646 | A1 * | 3/2004 | Visocnik | 463/16 |
| 2004/0053683 | A1 | 3/2004 | Hartl et al. | 463/25 |
| 2004/0092299 | A1 | 5/2004 | Gauselmann | 463/16 |
| 2004/0092300 | A1 | 5/2004 | Gauselmann | 463/16 |
| 2004/0100025 | A1 | 5/2004 | Conklin et al. | 273/292 |
| 2004/0137982 | A1 * | 7/2004 | Cuddy et al. | 463/20 |
| 2004/0219968 | A1 | 11/2004 | Fiden et al. | 463/20 |
| 2004/0219969 | A1 | 11/2004 | Casey et al. | 463/20 |
| 2004/0242316 | A1 | 12/2004 | Oles et al. | 463/20 |
| 2004/0259631 | A1 | 12/2004 | Katz et al. | 463/25 |
| 2004/0266507 | A1 | 12/2004 | Cooper | 463/13 |
| 2005/0054412 | A1 | 3/2005 | Gauselmann | 463/16 |
| 2005/0130731 | A1 | 6/2005 | Englman et al. | 463/20 |
| 2005/0130737 | A1 | 6/2005 | Englman et al. | 463/20 |
| 2006/0058097 | A1 * | 3/2006 | Berman et al. | 463/20 |
| 2006/0154717 | A1 * | 7/2006 | Jackson | 463/20 |
| 2006/0211484 | A1 | 9/2006 | Hornik et al. | 463/25 |
| 2007/0155474 | A1 * | 7/2007 | Gauselmann | 463/20 |
| 2010/0273550 | A1 * | 10/2010 | Marks et al. | 463/20 |

FOREIGN PATENT DOCUMENTS

| | | |
|---|---|---|
| WO | WO 00/32286 | 6/2000 |
| WO | WO 01/15055 A1 | 3/2001 |
| WO | WO 01/33478 AI | 5/2001 |
| WO | WO 02/054331 A2 | 7/2002 |
| WO | WO 03/089084 A1 | 10/2003 |

OTHER PUBLICATIONS

WMS Gaming Inc., "Big Bang Piggy Bankin'"™, *Product Sheet*, (undated), 1 page, Chicago, IL.

WMS Gaming Inc., "Stroke of Luck"™, *Product Sheet*, (undated), 1 page, Chicago, IL.

WMS Gaming Inc., "Top Cat"™, *Product Sheet*, (undated), 1 page, Chicago, IL.

WMS Gaming Inc., "Winning Streak "™, *Product Sheet*, (undated), 1 page, Chicago, IL.

PCT International Search Report for International Application No. PCT/US/2006/26360 dated Apr. 4, 2007 (3 pages).

International Search Report, dated Sep. 16, 2006.

* cited by examiner

WAGERING GAME WITH ENHANCEMENT FEATURE FOR BONUS-TRIGGERING EVENT

CROSS-REFERENCE TO RELATED APPLICATIONS

This application is a U.S. national phase of International Application No. PCT/US2006/001651, filed Jan. 17, 2006, which claims the benefit of priority of U.S. Provisional Patent Application No. 60/645,481, filed Jan. 18, 2005, both of which are incorporated by reference in their entirety.

FIELD OF THE INVENTION

The present invention relates generally to gaming terminals for playing a wagering game and, more particularly, to a gaming terminal having a plurality of movable symbol-bearing reels and having a feature for providing a special mode, implemented upon payment of an additional wager, pursuant to which symbol-bearing reels on which no bonus symbols are displayed after a first spin are re-spun to give the player additional opportunities to earn a bonus.

BACKGROUND OF THE INVENTION

Gaming machines, such as slot machines, video poker machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines.

Consequently, shrewd operators strive to employ the most entertaining and exciting machines available because such machines attract frequent play and, hence, increase profitability to the operator. In the competitive gaming machine industry, there is a continuing need for gaming machine manufacturers to produce new types of games, or enhancements to existing games, which will attract frequent play by enhancing the entertainment value and excitement associated with the game.

One concept that has been successfully employed to enhance the entertainment value of a game is that of a "bonus" game which may be played in conjunction with a "basic" game. The bonus game may comprise any type of game, either similar to or completely different from the basic game, and is entered upon the occurrence of a selected event or outcome of the basic game. Such a bonus game produces a significantly higher level of player excitement than the basic game because it provides a greater expectation of winning than the basic game.

Another concept that has been employed is the use of a progressive jackpot. In the gaming industry, a "progressive" involves collecting coin-in data from participating gaming device(s) (e.g., slot machines), contributing a percentage of that coin-in data to a jackpot amount, and awarding that jackpot amount to a player upon the occurrence of a certain jackpot-won event. The percentage of the coin-in is determined prior to any result being achieved and is independent of any result. A jackpot-won event typically occurs when a "progressive winning position" is achieved at a participating gaming device. If the gaming device is a slot machine, a progressive winning position may, for example, correspond to alignment of progressive jackpot reel symbols along a certain payline. The initial progressive jackpot is a predetermined minimum amount. That jackpot amount, however, progressively increases as players continue to play the gaming machine without winning the jackpot. Further, when several gaming machines are linked together such that several players at several gaming machines compete for the same jackpot, the jackpot progressively increases at a much faster rate, which leads to further player excitement.

In current basic games, the player is usually given a single opportunity to achieve entry to the bonus game. For example, if the player achieves less than a threshold number of bonus symbols required to achieve entry to the bonus game, the player typically has to place another bet and play the basic game from the beginning to try again to achieve the threshold number of bonus symbols. However, in the event that the player continues to fail to achieve the bonus, or comes tantalizing close to achieving the bonus (e.g., by achieving one less than the required number of bonus symbols), the player may become bored and move on to a different game. There are also gaming machines that change a payback percentage during a bonus game based on the amount of an initial wager, but not the player's chances of achieving a bonus. Current basic games also often give the player a predetermined amount of an item (e.g., five free spins) upon achievement of the bonus, instead of increasing the amount of the items available to the player when the player has made a second wager.

Thus, there is a need to allow a player to make an additional wager prior to playing the basic game, in exchange for an additional opportunity to achieve a bonus while in the middle of the basic game. This way, the player can achieve a portion of what is required to initiate the bonus, and then get a second chance to achieve the rest of the minimum required bonus combination. Wagering games need to include additional features that will maintain the player's interest and enhance entertainment. The present invention is directed to satisfying this and other needs.

SUMMARY OF THE INVENTION

The present invention is directed to a gaming terminal for playing a wagering game having a basic game and a bonus game. The gaming terminal includes a wager-input device. A display displays a plurality of moveable reels having symbols located thereon during the basic game. The symbols indicate a randomly-selected outcome selected from a plurality of outcomes. The basic game implements a special mode in response to an enablement by a player. In response to the special mode being enabled and at least one of the moveable reels displaying less than a full bonus-triggering combination, the moveable reels not displaying a portion of the full bonus-triggering combination are re-spun.

The present invention is also directed to a method of conducting a wagering game. A wager is received from a player. A game outcome is randomly selected from a plurality of outcomes in response to the wager. The game outcome for the wagering game is displayed as symbols on a plurality of symbol-bearing reels in alignment along at least one payline. A special mode is enabled that re-spins at least one of the symbol-bearing reels not displaying a portion of a full bonus-triggering combination after an initial spin.

The present invention is further directed to a gaming terminal for playing a wagering game. The gaming terminal includes at least one display and a controller coupled to the display. The controller is programmed to move symbols on a plurality of moveable reels across the display to indicate an outcome of a plurality of outcomes during an initial spin. The controller also enables a special mode to re-spin the moveable reels not displaying a portion of a full bonus-triggering combination after the initial spin.

The present invention is further directed to a gaming terminal for playing a wagering game having a basic game and a bonus game. The gaming terminal has a wager-input device and a display for displaying the basic game and the bonus game and implementing a special mode in response to an enablement by a player. In response to the special mode being enabled and the occurrence of a bonus-triggering event during the basic game, a special bonus game segment of the bonus game provides enhanced bonus awards.

The present invention is further directed to a method of conducting a wagering game having a basic game and a bonus game. A wager is received from a player, and the basic game and the bonus game are displayed. A special mode is enabled, and upon the occurrence of a bonus-triggering event during the basic game, a special bonus game segment of the bonus game provides enhanced bonus awards.

The above summary of the present invention is not intended to represent each embodiment or every aspect of the present invention. The detailed description and Figures will describe many of the embodiments and aspects of the present invention.

BRIEF DESCRIPTION OF THE DRAWINGS

The foregoing and other advantages of the invention will become apparent upon reading the following detailed description and upon reference to the drawings.

Figure 1:
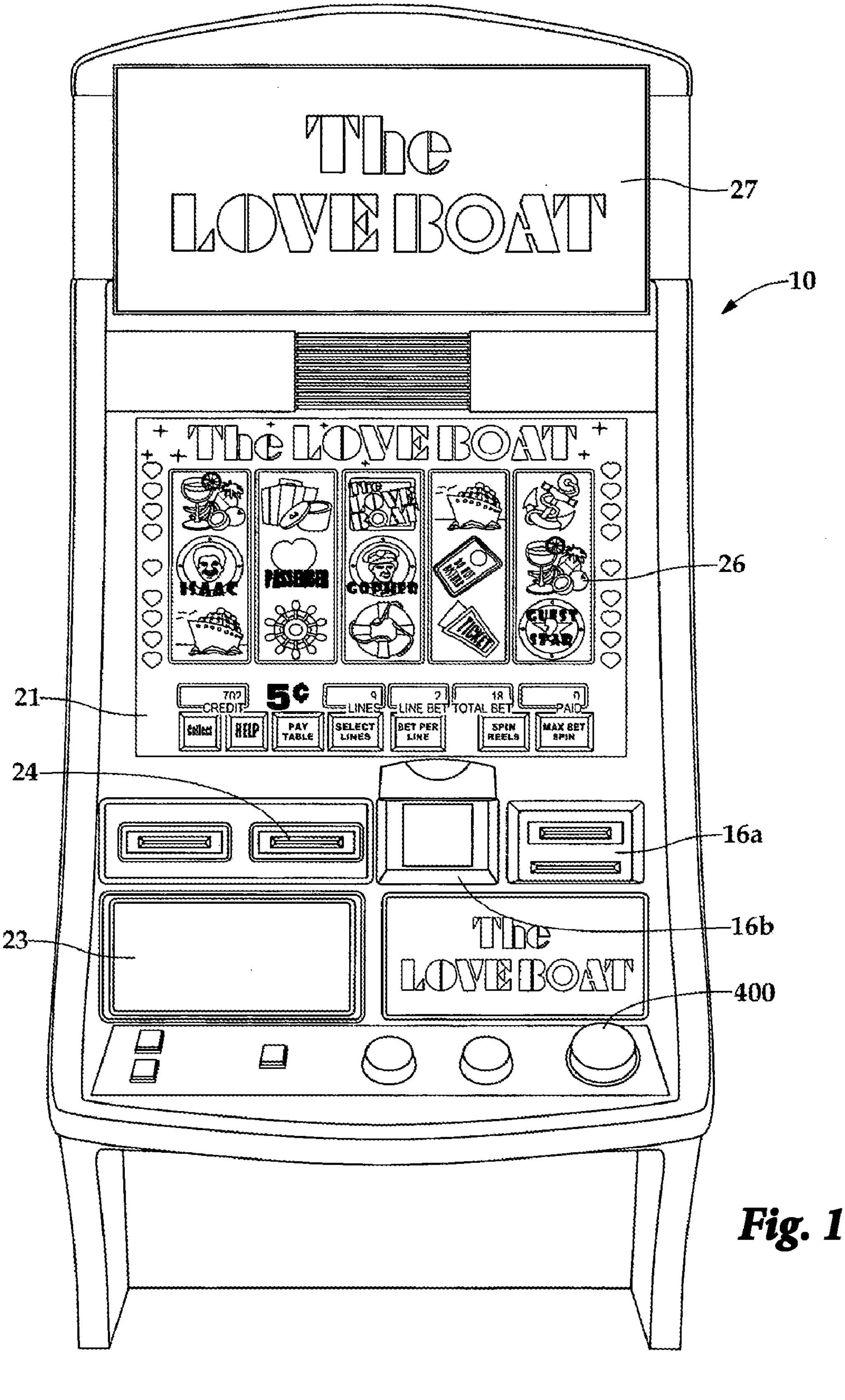
FIG. 1 is a perspective view of a video gaming terminal according to one embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

FIG. 1 shows a perspective view of a typical gaming terminal 10 used by gaming establishments, such as casinos. With regard to the present invention, the gaming terminal 10 may be any type of gaming terminal and may have varying structures and methods of operation. For example, the gaming terminal 10 may be a mechanical gaming terminal configured to play mechanical slots, or it may be an electromechanical or electrical gaming terminal configured to play video slots or a video casino game, such as blackjack, slots, keno, poker, etc.

As shown, the gaming terminal 10 includes input devices, such as a wager acceptor 16 (shown as a card wager acceptor 16*a* and a cash wager acceptor 16*b*), a touch screen 21, a push-button panel 22, and an information reader 24. For outputs, the gaming terminal 10 includes a payout mechanism 23, a main display 26 for displaying information about the basic wagering game, and a secondary display 27 that may display an electronic version of a pay table, and/or also possibly game-related information or other entertainment features. While these typical components found in the gaming terminal 10 are described below, it should be understood that numerous other elements may exist and may be used in any number of combinations to create various forms of a gaming terminal.

The wager acceptor 16 may be provided in many forms, individually or in combination. The cash wager acceptor 16*a* may include a coin slot acceptor or a note acceptor to input value to the gaming terminal 10. The card wager acceptor 16*b* may include a card-reading device for reading a card that has a recorded monetary value with which it is associated. The card wager acceptor 16*b* may also receive a card that authorizes access to a central account, which can transfer money to the gaming terminal 10.

Also included is the payout mechanism 23, which performs the reverse functions of the wager acceptor. For example, the payout mechanism 23 may include a coin dispenser or a note dispenser to output value from gaming terminal 10. Also, the payout mechanism 23 may also be adapted to receive a card that authorizes the gaming terminal to transfer credits from the gaming terminal 10 to a central account.

The push button panel 22 is typically offered, in addition to the touch screen 21, to provide players with an option on how to make their game selections. Alternatively, the push button panel 22 provides inputs for one aspect of operating the game, while the touch screen 21 allows for inputs needed for another aspect of operating the game.

The outcome of the basic wagering game is displayed to the player on the main display 26. The main display 26 may take the form of a cathode ray tube (CRT), a high resolution LCD, a plasma display, LED, or any other type of video display suitable for use in the gaming terminal 10. As shown, the main display 26 includes the touch screen 21 overlaying the entire monitor (or a portion thereof) to allow players to make game-related selections. Alternatively, the gaming terminal 10 may have a number of mechanical reels to display the game outcome, as well.

In some embodiments, the information reader 24 is a card reader that allows for identification of a player by reading a card with information indicating his or her true identity. Currently, identification is used by casinos for rewarding certain players with complimentary services or special offers. For example, a player may be enrolled in the gaming establishment's players' club and may be awarded certain complimentary services as that player collects points in his or her player-tracking account. The player inserts his or her card into the player-identification card reader 24, which allows the casino's computers to register that player's wagering at the gaming terminal 10. The information reader 24 may also include a keypad (not shown) for entering a personal identification number (PIN). The gaming terminal 10 may require that the player enter their PIN prior to obtaining information. The gaming terminal 10 may use the secondary display 27 for providing the player with information about his or her account or other player-specific information. Also, in some embodiments, the information reader 24 may be used to restore assets that the player achieved during a previous game session and had saved.

Figure 2:
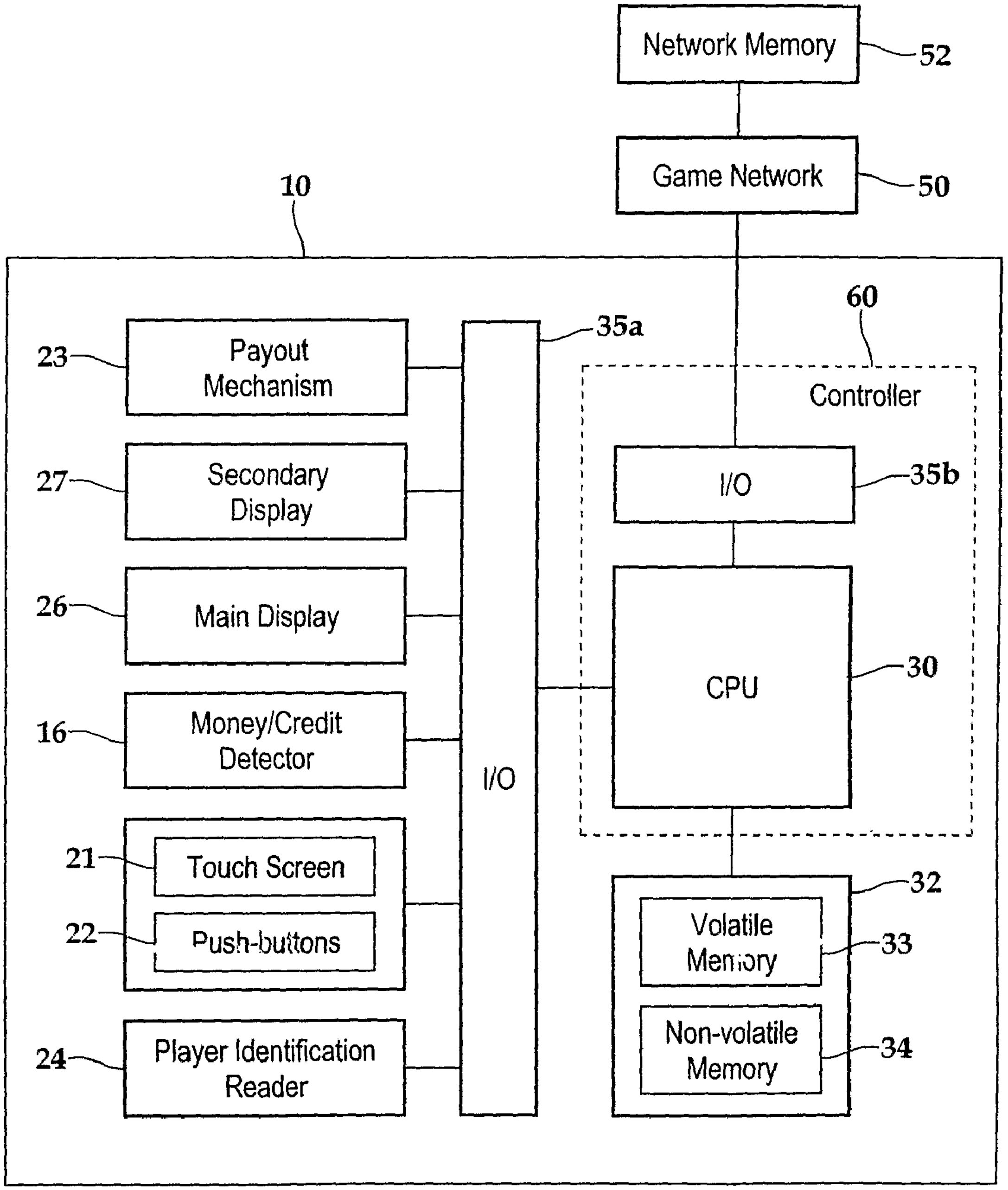
FIG. 2 is a block diagram of the gaming terminal of FIG. 1.

As shown in FIG. 2, the various components of the gaming terminal 10 are controlled by a central processing unit (CPU) 30 (such as a microprocessor or microcontroller). To provide the gaming functions, the CPU 30 executes a game program that allows for the randomly selected outcome. The CPU 30 is also coupled to or includes a local memory 32. The local memory 32 may comprise a volatile memory 33 (e.g., a random-access memory (RAM)) and a non-volatile memory 34 (e.g., an EEPROM). It should be appreciated that the CPU 30 may include one or more microprocessors. Similarly, the local memory 32 may include multiple RAM and multiple program memories.

Communications between the peripheral components of the gaming terminal 10 and the CPU 30 occur through input/output (I/O) circuits 35*a*. As such, the CPU 30 also controls and receives inputs from the peripheral components of the gaming terminal 10. Further, the CPU 30 communicates with external systems via the I/O circuits 35*b*. Although the I/O circuits 35 may be shown as a single block, it should be appreciated that the I/O circuits 35 may include a number of different types of I/O circuits.

In some embodiments, the CPU 30 may not be inside the gaming terminal 10. Instead, the CPU 30 may be part of a game network 50 (FIG. 2) and may be used to control numerous gaming terminals 10. In these embodiments, the CPU 30 will run the basic games for each of the gaming terminals 10, and may also be used to link the gaming terminals 10 together. The game network 50 can include progressive jackpots that are contributed to by all or some of the gaming terminals 10 in the network (e.g., terminal-level jackpots that only each terminal 10 contributes to, bank-level jackpots that are contributed to by all of the terminals 10 in a particular bank, and wide-area jackpots that are contributed to by a larger number of terminals 10, such as multiple banks). Alternatively, the game network 50 can allow the player to retrieve assets obtained while playing one terminal 10 at a different gaming terminal that is also part of the game network. Assets may be any number of things, including, but not limited to, monetary or non-monetary awards, features that a player builds up in a bonus or progressive game to win awards, etc.

In some embodiments, the CPU 30 is also used with the information reader 24 to restore saved assets. For example, in one embodiment, the information reader 24 is adapted to receive and distribute tickets (see FIG. 4). The tickets each include a unique identifier. The unique identifier links the ticket to a file contained within the local memory 32 or a system memory 52 located in the game network 50. The file includes the assets that are being stored from a previous game. Monetary awards include game credits or money, while the non-monetary awards can be bonus tokens, free plays (e.g., free spins), multipliers, or access to bonus and/or progressive games. The player may also be awarded the option of selecting between receiving a certain value of standard credits or receiving bonus tokens that are redeemable for a special wagering event.

The gaming terminal 10 and associated gaming control system is capable of executing wagering games on or through a controller 60. Controller 60, as used herein, comprises any combination of hardware, software, and/or firmware that may be disposed or resident inside and/or outside of a gaming terminal 10 or like machine which may communicate with and/or control the transfer of data between the gaming terminal and a bus, another computer, processor, or device, and/or a service and/or a network. The network may include, but is not limited to a peer-to-peer, client/server, master/slave, star network, ring network, bus network, or other network architecture wherein at least one processing device (e.g., computer) is linked to at least one other processing device. The controller 60 may comprise the I/O circuits 35*b* and the CPU 30. In other embodiments, the CPU 30 may be housed outside of the controller 60, and a different processor may be housed within the controller 60. The controller 60, as used herein, may comprise one or more controllers. In one implementation, each gaming terminal 10 comprises, or is connected to, a controller 60 enabling each gaming terminal 10 to transmit and/or receive signals, preferably both, in a peer-to-peer arrangement. In another example, the controller 60 may be adapted to facilitate communication and/or data transfer for one or more gaming terminals 10 in a client/server or centralized arrangement. In one aspect, shown in FIG. 2, the controller 60 may connect the gaming terminal 10 via a conventional I/O port and communication path (e.g. serial, parallel, IR, RC, 10bT, etc.) to a game network 50, which may include, for example, other gaming terminals connected together in the network 50.

Figure 3:
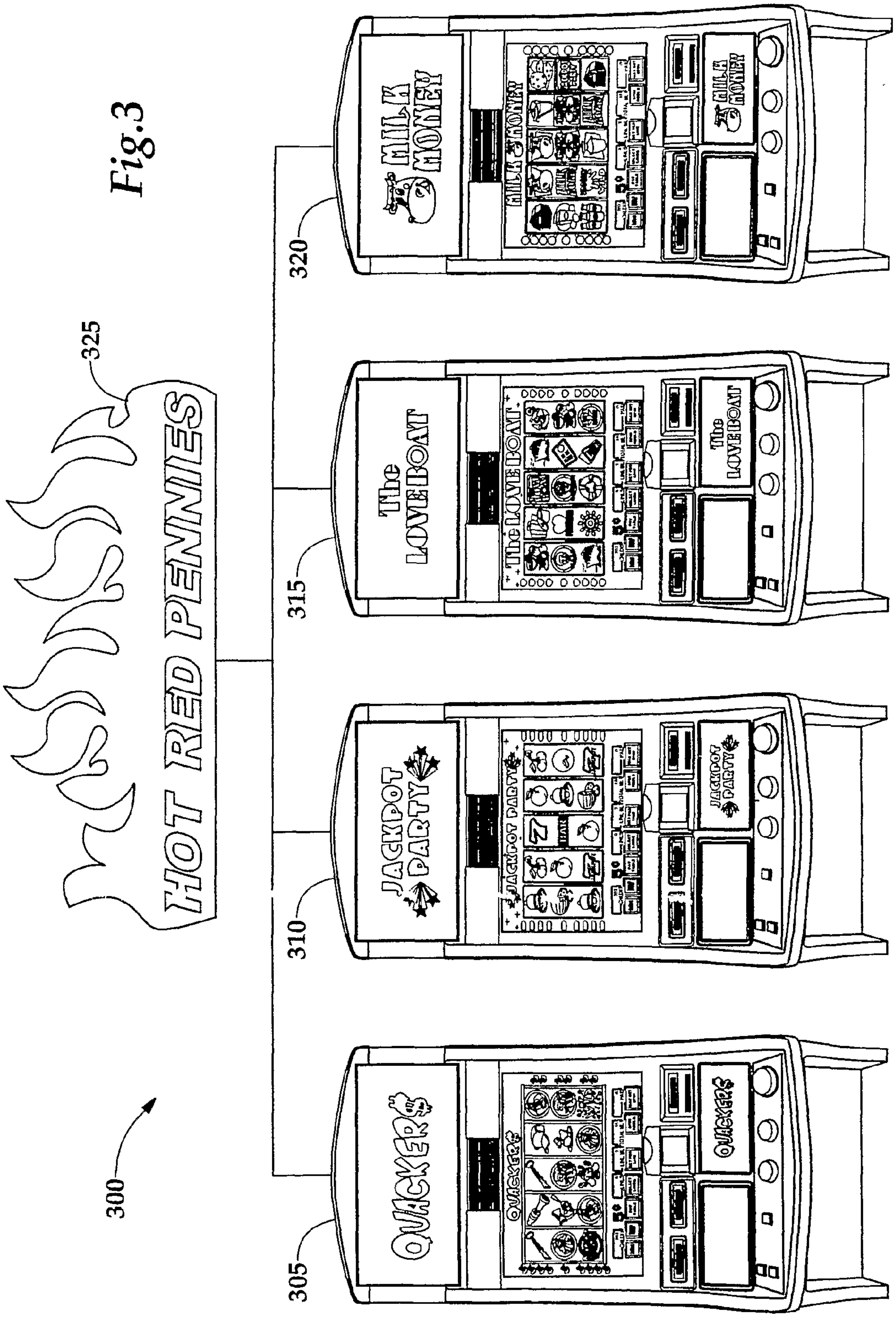
FIG. 3 illustrates a bank of gaming terminals according to an embodiment of the invention.

FIG. 3 illustrates a bank 300 of gaming terminals 305, 310, 315, and 320 according to an embodiment of the invention. Each of the gaining terminals 305, 310, 315, and 320 may implement a wagering game having a gaming enhancement feature entitled "Hot Red Pennies." "Hot Red Pennies" is an enhancement feature/mode that makes it easier for a player to achieve a bonus. Specifically, when in the "Hot Red Pennies" mode and the player plays the wagering game and fails to achieve the minimum combination of bonus symbols to achieve the bonus, reels on which no bonus symbols were visible are re-spun to give the player an extra chance to achieve the bonus. In some embodiments, the player must achieve a minimum number of bonus symbols visible on the reels before any of the reels will be re-spun. For example, if three bonus symbols at any location on the display are required to trigger the bonus (i.e., scattered symbols), and the player has achieved only two bonus symbols after the initial spin, the other reels are re-spun when the "Hot Red Pennies" mode has been enabled. However, if only one of the bonus symbols was visible, then none of the reels would be re-spun even in the "Hot Red Pennies" mode. In other embodiments, only one (or even zero) bonus symbols need to be visible prior to the re-spinning of the reels when the "Hot Red Pennies" mode has been enabled.

The "Hot Red Pennies" feature is available to the player, and may be enabled by making a second wager, in addition to the standard wager at the start of the wagering game. The "Hot Red Pennies" feature may be implemented in a slot game having a plurality of moveable reels, where bonus features are achieved based on either scatter or single-line payouts.

As illustrated, the first gaming terminal 305 implements a wagering game called "Quaker$," the second gaming terminal 310 implements a wagering game called "Jackpot Party," the third gaming terminal 315 implements a game called "The Love Boat," and the fourth gaming terminal 320 implements a game called "Milk Money." Each of these gaming terminals may be located near a "Hot Red Pennies" marquee 325. Each of these gaming terminals may offer the player an opportunity to earn free spins when a bonus is achieved. The "Hot Red Pennies" feature may also be implemented with other games in which bonuses other than free spins are available to the player, such as "Gem Hunter" (based on a jungle theme), "King of Africa" (based on an African safari theme), and "Blue Lagoon" (based on a Caribbean theme).

Figure 5:
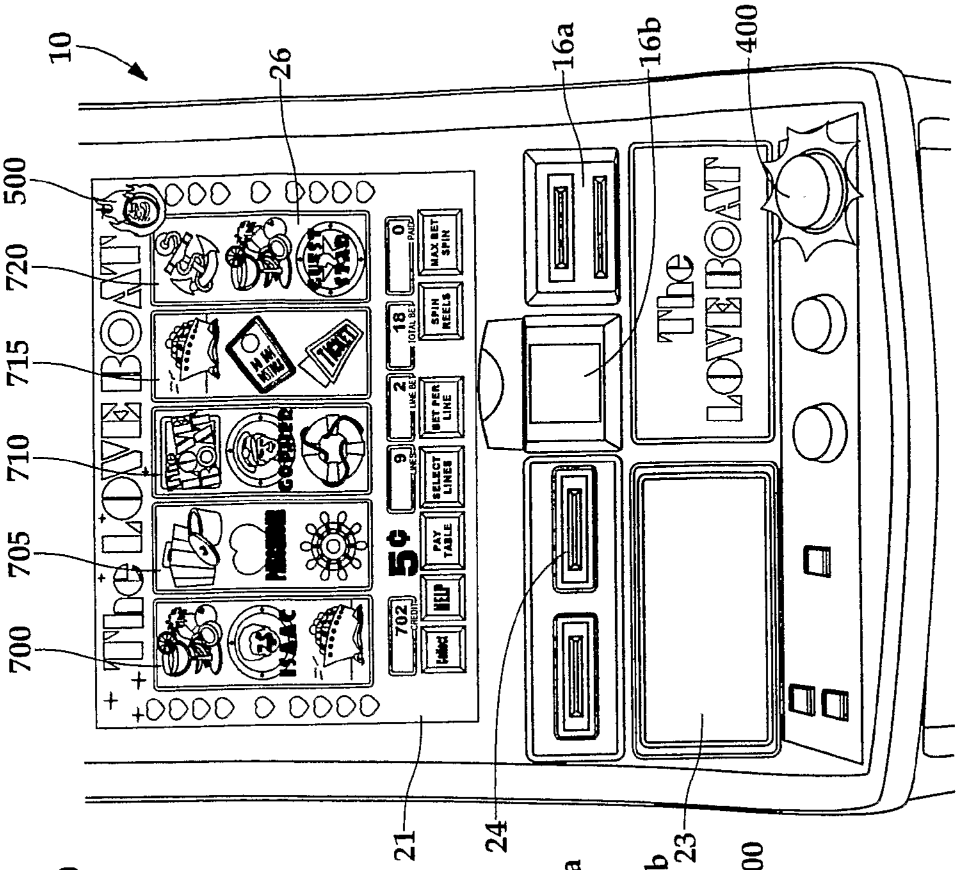
FIGS. 4 and 5 illustrate a gaming terminal implementing a wagering game, and having a special mode initiating button according to an embodiment of the invention.
Figure 4:
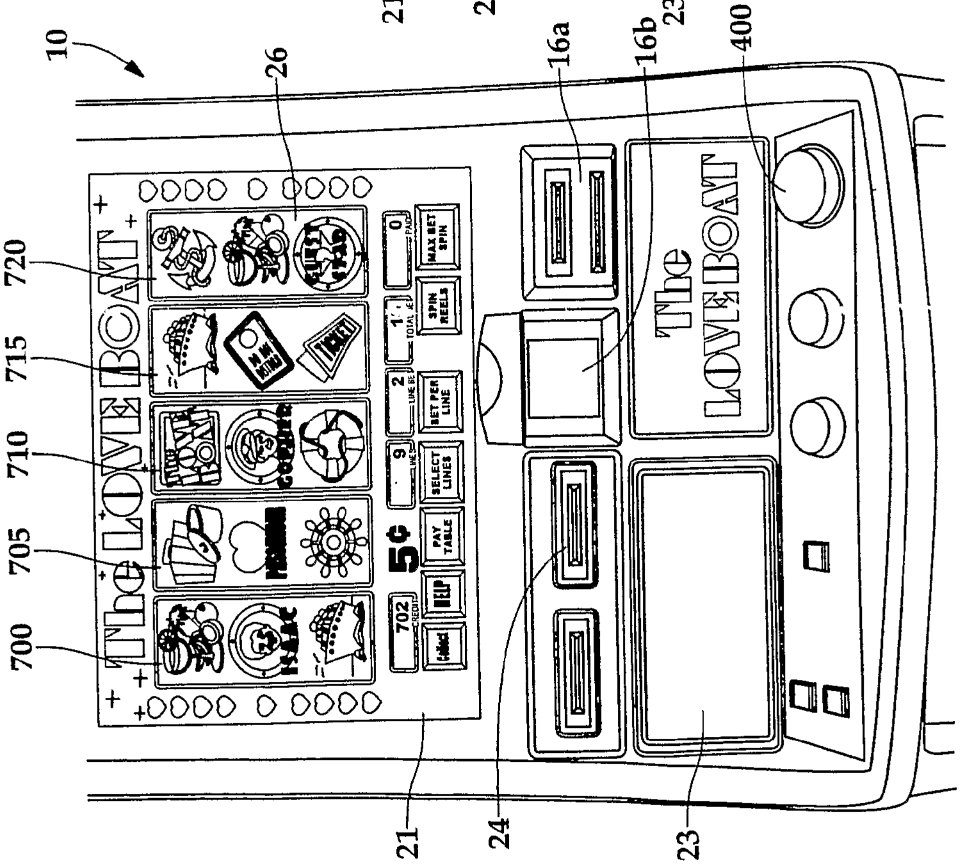

FIGS. 4 and 5 illustrate the third gaming terminal 315 implementing a wagering game, and having a special mode initiating button 400 according to an embodiment of the invention. As shown, the gaming terminal 315 implements a wagering game entitled "The Love Boat," in which a player may be awarded free spins upon achieving a bonus. The gaming terminal 315 includes a special mode initiating button 400 to implement the "Hot Red Pennies" mode. After making an initial wager to play the basic wagering game, the player may press the special mode initiating button 400 to enable the "Hot Red Pennies" mode. After pressing this button 400, the player is required to wager additional credits to enable the "Hot Red Pennies" mode.

As shown in FIG. 5, after the "Hot Red Pennies" mode has been enabled, a symbol 500 representing a penny on fire appears on the display screen. Although shown in the upper right hand corner of the display screen in FIG. 5, the penny-on-fire symbol 500 may be displayed anywhere on the screen. The penny-on-fire symbol 500 indicates that the "Hot Red Pennies" mode is enabled. Also, the special mode initiating button 400 flashes or emits light, via a light in the bezzle, to further indicate that the mode is enabled.

Figure 6:
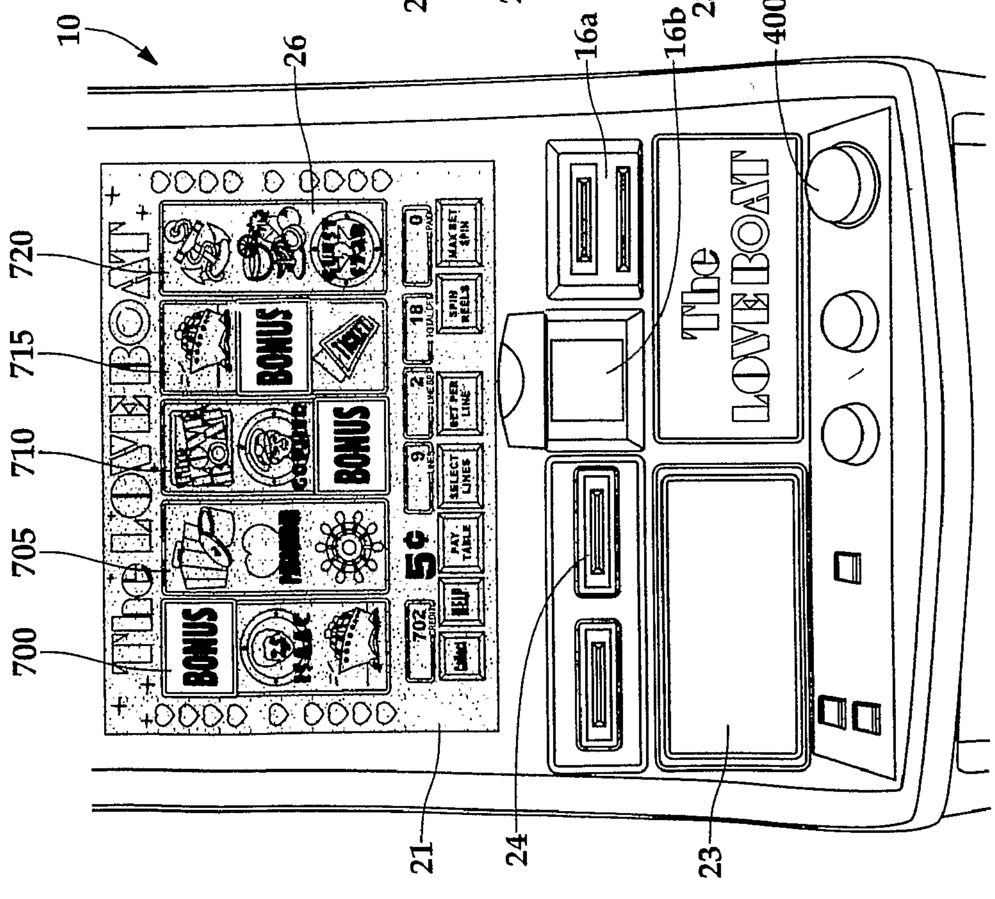
FIG. 6 illustrates the results on an initial spin of the wagering game according to an embodiment of the invention.

FIG. 6 illustrates the results on an initial spin of the wagering game according to an embodiment of the invention. In the event that the wagering game allows scatter combinations of symbols to trigger a bonus, these three bonus symbols would represent a winning combination that would trigger the bonus. The display screen shown in FIG. 6 is for the wagering game when the "Hot Red Pennies" mode has not been enabled. Although a winning combination is displayed, if the player had only achieved two of the bonus symbols, the player would not have been awarded the bonus. Because the player achieved the bonus when the "Hot Red Pennies" mode was not enabled, the player is awarded a set amount of a bonus item (e.g., five free spins) or a chance to play a bonus game, such as the one shown in FIGS. 10 and 11.

Figure 7:
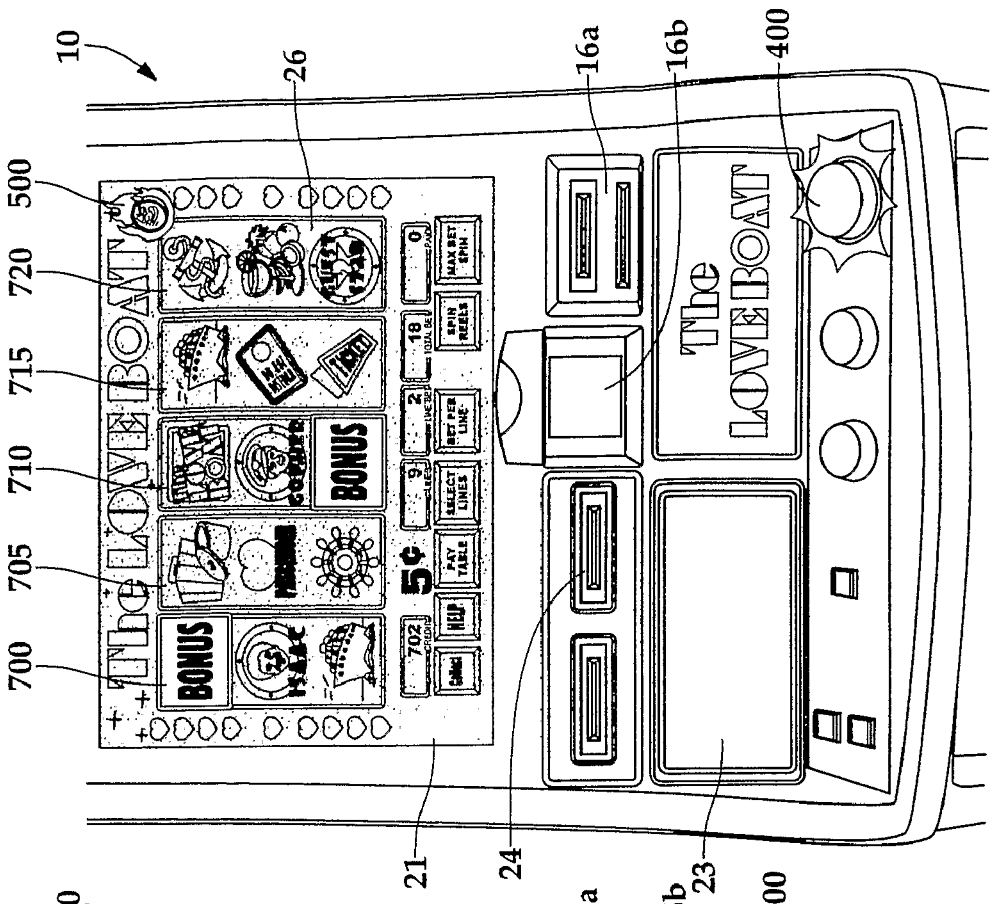
FIG. 7 illustrates the results on an initial spin of the wagering game where the "Hot Red Pennies" mode has been enabled according to an embodiment of the invention.

FIG. 7 illustrates the results on an initial spin of the wagering game where the "Hot Red Pennies" mode was enabled according to an embodiment of the invention. As shown, two bonus symbols are displayed (on the first 700 and third 710 reels), which would not be enough to trigger the bonus. However, because the "Hot Red Pennies" mode was enabled by activating the button 400 and paying a secondary wager, the reels on which the bonus symbol was not displayed will be re-spun. In other words, because the first 700 and the third 710 reels are the only ones on which the bonus symbol are displayed, the second 705, fourth 715 and fifth 720 reels will be re-spun.

Figure 8:
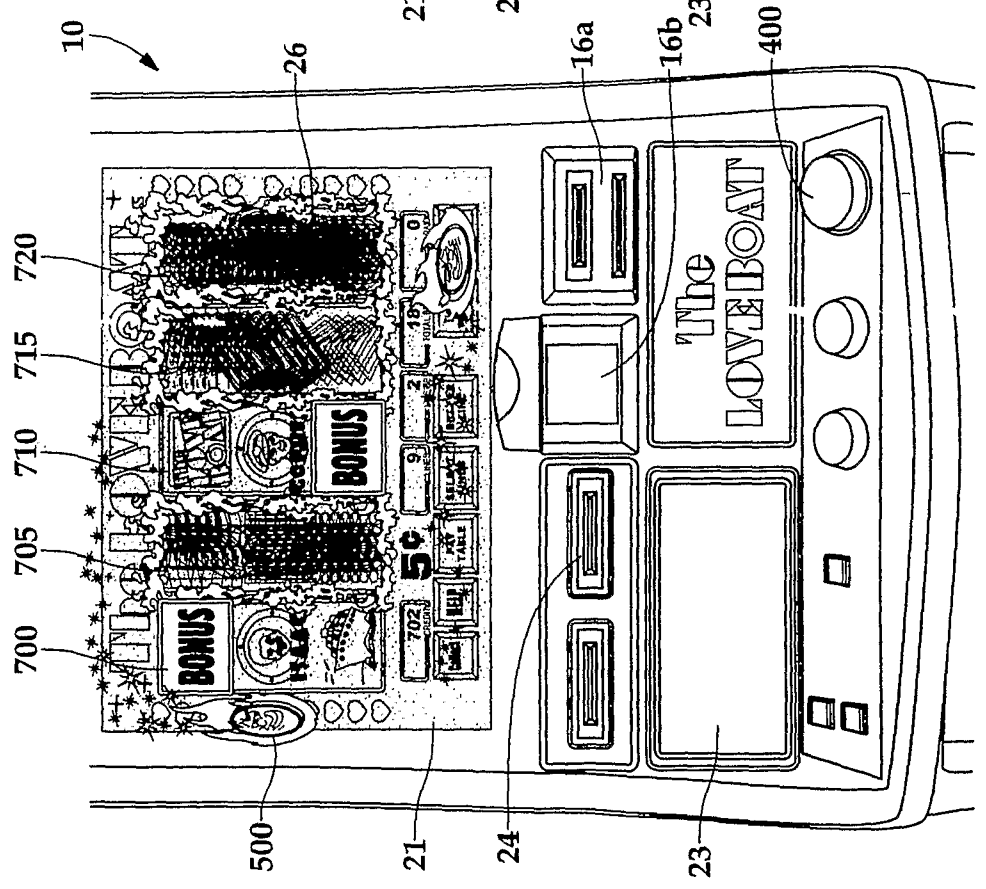
FIG. 8 illustrates the re-spinning of the reels on which the bonus symbol are not displayed after the first spin according to an embodiment of the invention.

FIG. 8 illustrates the re-spinning of the reels on which the bonus symbol were not displayed after the first spin according to an embodiment of the invention. As shown, the second 705, fourth 715 and fifth 720 reels are in the process of being re-spun due to the enabled "Hot Red Pennies" mode. As shown, the penny-on-fire symbol 500 may move across the display during the re-spins. As discussed above, with respect to FIG. 3, in some embodiments, in the "Hot Red Pennies" mode, reels are only re-spun when at least two of the reels displays a bonus-triggering symbol. In other embodiments, all of the reels are re-spun even if only one (or none) of the reels display a bonus-triggering symbol.

Figure 9:
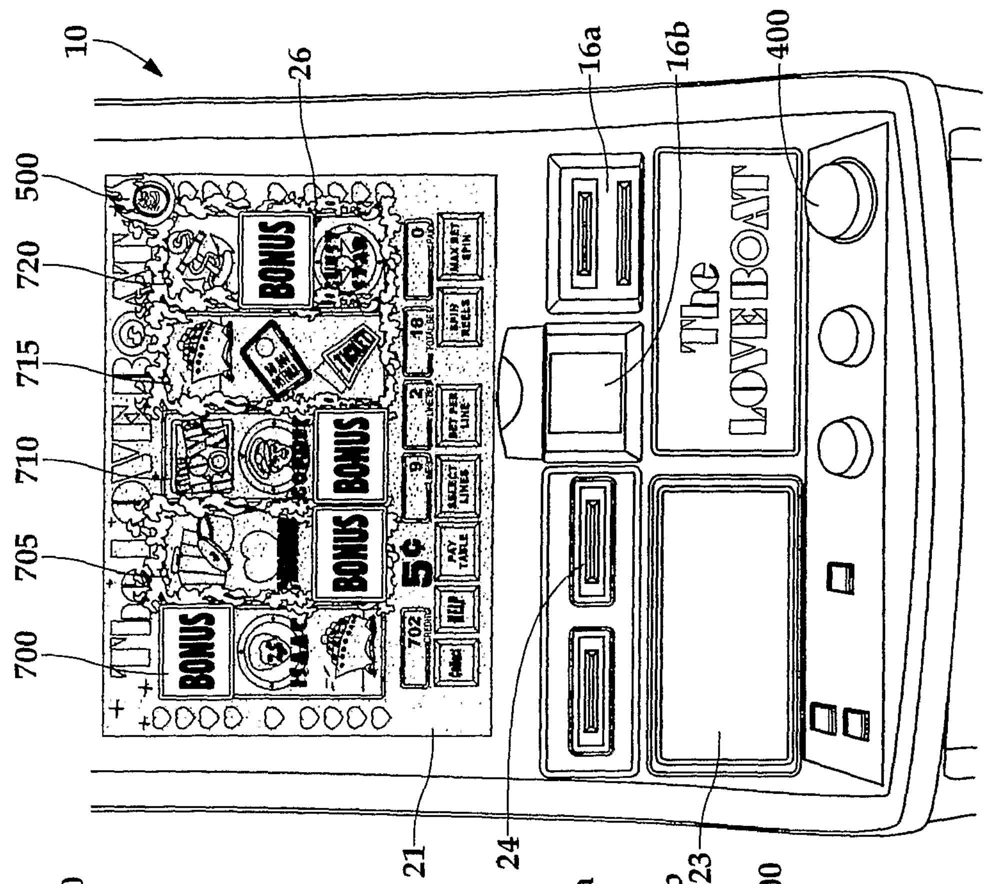
FIG. 9 illustrates the results of the re-spun reels according to an embodiment of the invention.

FIG. 9 illustrates the results of the re-spun reels according to an embodiment of the invention. As shown, the second 705 and the fifth 720 reel now display the bonus symbol, in addition to the bonus symbols that are still displayed on the first 700 and the third 710 reels. According, a total of four bonus symbols are now displayed, and the bonus is triggered.

Figure 11:
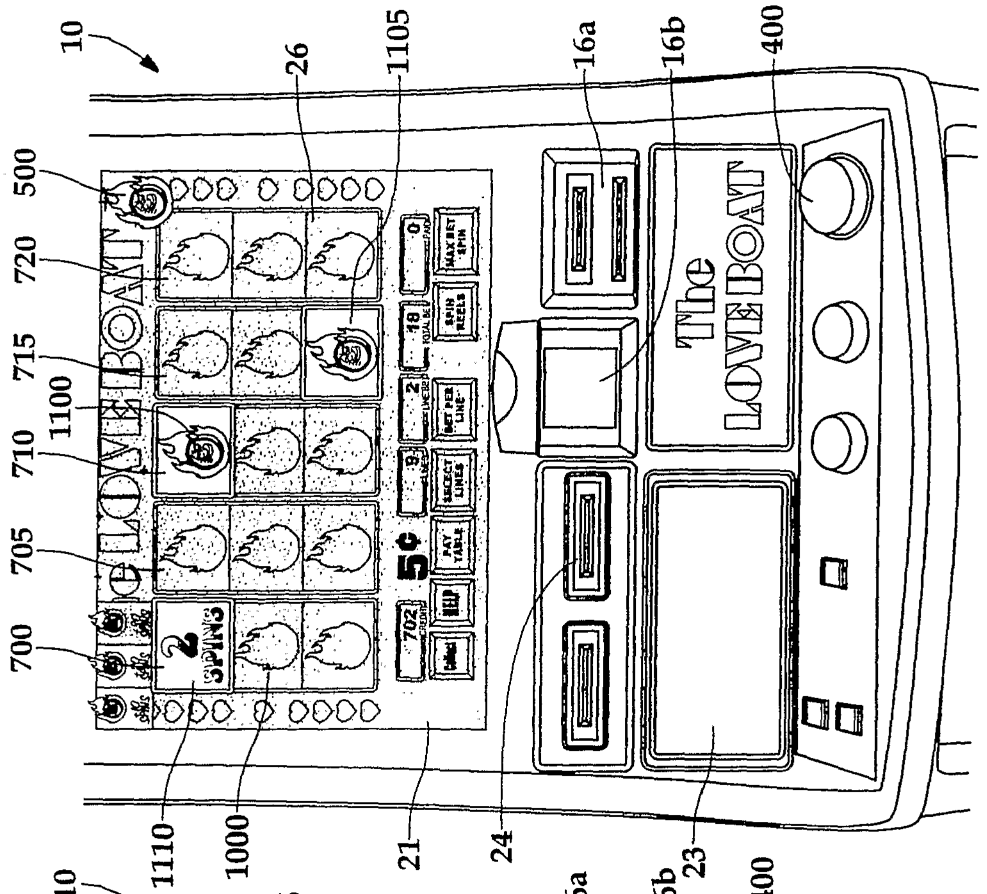
FIGS. 10 and 11 illustrate display screens of a bonus game according to an embodiment of the invention.
Figure 10:
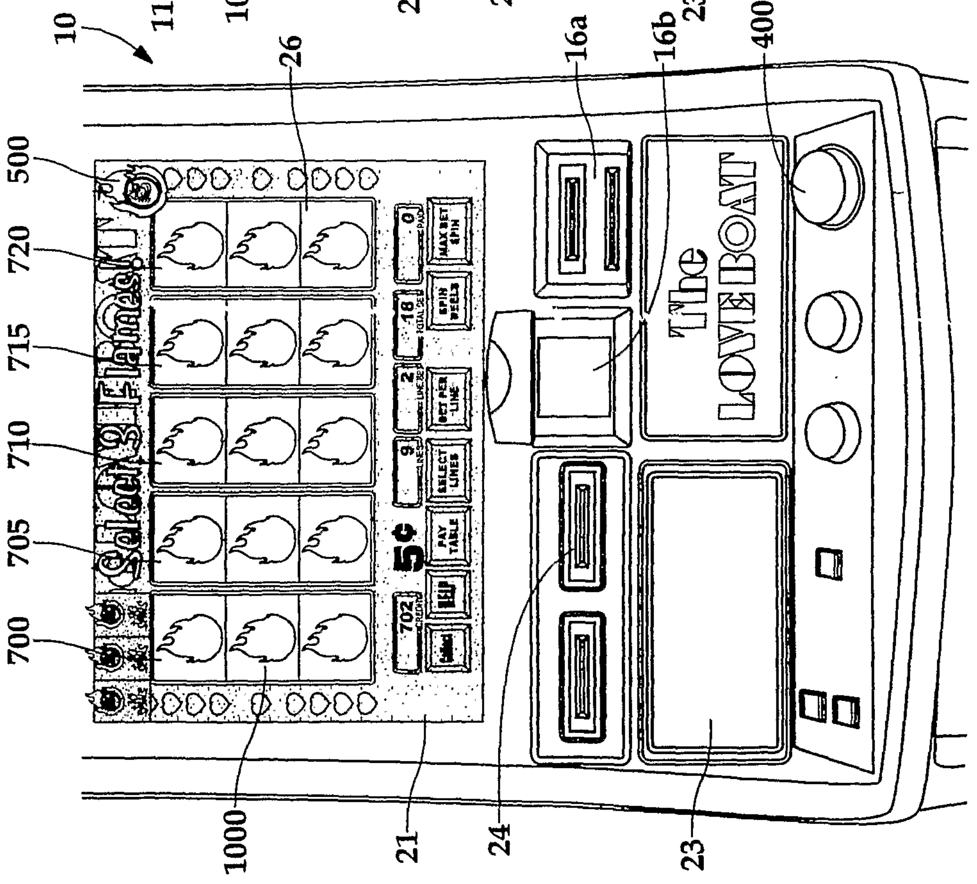

FIGS. 10 and 11 illustrate display screens of a secondary game, or a bonus game, according to an embodiment of the invention. Another benefit of enabling the "Hot Red Pennies" mode is that in the event that the player achieves the bonus-inducing combination, the player may be presented with a bonus game having enhanced or increased potential awards versus what would be available if the "Hot Red Pennies" mode had not been enabled.

As shown in FIG. 10, the player may be presented with a plurality of player-selectable elements 1000. In this case, the player is shown fifteen player-selectable elements (three on each of the five reels) and is instructed to select three of the player-selectable elements, each of which may hide an award. The player-selectable elements 1000 may be displayed as flames. The selections may be made by, e.g., pressing the touch screen 21.

FIG. 11 illustrates the results of the player's three selections. As shown, the player selected two player-selectable elements 1100 and 1105, under which two "Hot Red Pennies" symbols were located. These "Hot Red Pennies" symbols may each represent ten free spins, or some other valuable award. The other selected player-selectable element 1110 was hiding two free spins for the player. In general, the "Hot Red Pennies" symbols award significantly more free spins than the selections that do not reveal Hot Red Pennies.

In other embodiments, the player selects player-selectable elements 1000 until a bonus game-ending element is selected. Additional embodiments allow the player to select more or fewer than three player-selectable elements 1000. The bonus game described above allows the player to accumulate a larger bonus than would be possible if the player had not enabled the "Hot Red Pennies" mode.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A gaming system for playing a wagering game including a special re-spin mode to initiate a bonus game, the gaming system comprising:

an input device;

one or more display devices; and a controller including one or more processors, the controller being operative to enable the special re-spin mode in response to an input from the player via the input device, the controller being further operative to, display, via the one or more displays during a basic game, a randomly-generated outcome comprising a symbol combination from a plurality of symbol combinations on a plurality of moveable, symbol-bearing reels, wherein at least one symbol combination from the plurality of symbol combination is a designated bonus-triggering symbol combination, and in response to the special mode being enabled and displaying the randomly-generated outcome not comprising the bonus-triggering symbol combination, (i) hold any reels displaying a portion of the bonus-triggering symbol combination, (ii) re-spin any reels not displaying a portion of the bonus-triggering combination to display a new randomly-generated outcome, and (iii) initiate the bonus game if the new randomly-generated outcome completes the bonus-trigging symbol combination.

2. The gaming system of claim 1, wherein the plurality of moveable, symbol-bearing reels are mechanical reels.

3. The gaming system of claim 1, wherein the plurality of moveable reels includes video reels.

4. The gaming system of claim 1, wherein the one or more displays include at least one payline that traverses the plurality of moveable reels.

5. The gaming terminal of claim 1, wherein the special mode is enabled via an additional wager.

6. The gaming system of claim 1, wherein at least one of the moveable reels not displaying a portion of the bonus triggering symbol combination is re-spun in response to a predetermined number of the moveable reels displaying a portion of the bonus-triggering symbol combination after an initial spin.

7. The gaming system of claim 1, where the bonus game is triggered by a bonus-triggering symbol combination, and a special bonus game screen is displayed only when the special mode has been enabled.

8. A method of conducting a wagering game, the method comprising:

receiving a wager from a player via an input device;

using one or more controllers to randomly select a game outcome from a plurality of outcomes in response to the wager, wherein at least one of the game outcomes from the plurality of outcomes is a combination of symbols designated a bonus-triggering symbol combination;

displaying, via one or more displays, the selected game outcome as symbols on a plurality of symbol-bearing reels in alignment along at least one payline;

if the selected game outcome does not include the bonus-triggering symbol combination, using at least one of the one or more controllers to enable a special mode to re-spin any symbol-bearing reels not displaying a portion of the bonus-triggering symbol combination after an initial spin, while holding any symbol-bearing reels displaying a portion of the bonus-triggering symbol; and conducting a bonus game in response to displaying the bonus-triggering symbol combination after re-spinning the reels.

9. The method of claim 8, wherein the special mode is enabled via an additional wager.

10. The method of claim 8, wherein at least one of the symbol bearing reels not displaying a portion of the bonus-triggering symbol combination is re-spun only when a predetermined number of the symbol-bearing reels each display a portion of the bonus-triggering symbol combination after the initial spin.

11. The method of claim 8, where a bonus is triggered by a bonus-triggering symbol combination, and a special bonus game screen is displayed only when the special mode has been enabled.

12. A gaming terminal for playing a wagering game, comprising:

one or more displays; and a controller coupled to the one or more displays and programmed to vary symbols on a plurality of moveable, symbol-bearing reels displayed via the one or more displays to indicate an outcome of a plurality of outcomes during an initial spin, wherein at least one outcome from the plurality of outcomes is a combination of symbols designated a bonus-triggering symbol combination, if the indicated outcome does not include the bonus-triggering symbol combination, enable a special mode to re-spin the moveable reels not displaying a portion of the bonus-triggering symbol combination after the initial spin, hold the moveable reels displaying a portion of the bonus-triggering symbol combination, and conduct a bonus game in response to displaying the bonus-triggering symbol combination after the special mode re-spins the reels.

13. The gaming terminal of claim 12, wherein the controller enables the special mode in response to an additional wager made via an input device.

14. The gaming terminal of claim 12, wherein at least one of the moveable reels not displaying a portion of the bonus triggering symbol combination is re-spun only when a predetermined number of the moveable reels display a portion of the bonus-triggering symbol combination after the initial spin.

15. The gaming terminal of claim 12, wherein the controller is located within the gaming terminal.

16. The gaming terminal of claim 12, wherein the controller is located outside of the gaming terminal.

17. The gaming terminal of claim 12, where a bonus is triggered by a bonus-triggering symbol combination, and a special bonus game screen is displayed only when the special mode has been enabled.

18. A method of conducting a wagering game, the method comprising:

receiving a wager from a player via an input device;

in response to receiving the wager, using one or more controllers to vary symbols on a plurality of moveable reels displayed via one or more displays, the symbols indicating an outcome of a plurality of outcomes after an initial spin, wherein at least one of the outcomes from the plurality of outcomes is a combination of symbols designated a bonus-triggering symbol combination;

if the indicated outcome does not include the bonus-triggering symbol combination, using the one or more controllers to enable a special mode to re-spin the moveable reels not displaying a portion of the bonus-triggering symbol combination after the initial spin, while holding the moveable reels displaying a portion of the bonus-triggering symbol combination; and conducting a bonus game in response to displaying the bonus-triggering symbol combination after re-spinning the reels.

19. The method of claim 18, further comprising enabling the special mode in response to receiving an additional wager via the input device.

20. The method of claim 18, further comprising re-spinning at least one of the moveable reels not displaying a portion of the bonus triggering symbol combination only when a predetermined number of the moveable reels display a portion of the bonus-triggering symbol combination after the initial spin.

21. The method of claim 18, further comprising:

triggering a bonus by a bonus-triggering symbol combination; and displaying a special bonus game screen only when the special mode has been enabled.

22. A method of conducting a wagering game including a basic game and a bonus game, the method comprising:

receiving a wager from a player to start the basic game with an initial spin of a plurality of symbol-bearing reels;

enabling a special re-spin mode in response to an input from a player via an input device;

displaying, on the plurality of symbol-bearing reels and via one or more displays, a symbol combination from a plurality of symbol combinations to indicate a game outcome, wherein at least one symbol combination from the plurality of symbol combinations is a designated bonus-triggering symbol combination;

in response to the game outcome including the bonus-triggering symbol combination, initiating the bonus game; and in response to the game outcome not including the bonus-triggering symbol combination when the special mode is enabled, holding any reels displaying a portion of the bonus-triggering symbol combination, re-spinning any reels not displaying a portion of the bonus-triggering symbol combination, and initiating the bonus game if the bonus-triggering symbol combination is displayed after re-spinning the reels.

23. The method of claim 22, further comprising, when the game outcome does not include the bonus-triggering symbol combination and the bonus game is initiated after the special re-spin mode, the bonus game comprises a higher expected value than the bonus game initiated after the bonus-triggering symbol combination is displayed after the initial spin.

24. The method of claim 23, wherein the higher expected value comprises larger awards for winning bonus outcomes.

25. The method of claim 23, wherein the higher expected value comprises a higher probability of achieving a winning bonus outcome.

26. The method of claim 22, further comprising, in response to the game outcome including at least one reel displaying a portion of the bonus-triggering symbol combination, holding the at least one reel and re-spinning the other reels; and in response to the game outcome not including any reels displaying a portion of the bonus-triggering symbol combination, evaluating the game outcome of the initial spin and awarding the player any awards associated with the game outcome.

27. The method of claim 22, wherein the special re-spin mode is enabled by the player via a special-mode-initiating button.

28. The method of claim 22, wherein the special re-spin mode is enabled via an additional wager by the player.

29. The method of claim 28, wherein the additional wager is added to a maximum bet placed on all available paylines.

* * * * *